United States Patent [19]

Borsuk

[11] Patent Number: 4,496,213
[45] Date of Patent: Jan. 29, 1985

[54] AUDIBLE INDICATOR FOR A CONNECTOR

[75] Inventor: Leslie M. Borsuk, Los Alamitos, Calif.

[73] Assignee: International Telephone & Telegraph Corporation, New York, N.Y.

[21] Appl. No.: 437,738

[22] Filed: Oct. 29, 1982

[51] Int. Cl.³ .............................................. G02B 7/26
[52] U.S. Cl. ............................ 350/96.22; 339/113 R; 350/96.21
[58] Field of Search ............... 350/96.20, 96.21, 96.22; 339/65, 75 R, 91 B, 113 R, 252 S, 253 R, 253 S

[56] References Cited

U.S. PATENT DOCUMENTS

| 4,184,742 | 1/1980 | Corrales | 350/96.21 |
| 4,185,886 | 1/1980 | Corrales | 350/96.21 |
| 4,268,115 | 5/1981 | Slemon et al. | 350/96.21 |
| 4,277,125 | 7/1981 | Ball | 339/113 R |
| 4,290,662 | 9/1981 | Storcel | 339/113 R X |

FOREIGN PATENT DOCUMENTS 55-50203  4/1980  Japan ................................ 350/96.21

Primary Examiner—John Lee
Attorney, Agent, or Firm—T. L. Peterson

[57] ABSTRACT

An audible indicator is provided for a connector which indicates when the mating connector halves are fully interengaged. The indicator is activated by an actuating pin which is mounted within the interior of the connector body. Preferably, the actuating pin is slidable in a centrally located polarizing key for the connector.

16 Claims, 5 Drawing Figures

AUDIBLE INDICATOR FOR A CONNECTOR

BACKGROUND OF THE INVENTION

The present invention relates generally to a connector and, more particularly, to a device which will provide an audible indication of complete mating of two halves of a connector assembly.

It is well known in the electrical connector art to have some means for audibly indicating when the mating havles of the electrical connector are fully interengaged. Typically, such a mechanism is a detent device or clicker mounted in the coupling nut of the connector which necessarily results in the diameter of the connector being increased due to the inclusion of the additional parts of the connector. For some applications it is desirable to maintain the diameter of the connector at a minimum which is not possible if the conventional indicators are utilized.

Accordingly, it is the object of the present invention to provide an audible indicator for a connector which, rather than being located within the coupling nut of the connector, is located within the connector body so that the diameter of the connector may be maintained at a minimum, thereby allowing miniature connectors to be manufactured with audible indicators which indicate the full mating condition of the mating halves of the connector.

The present invention is applicable to both electrical and fiber optic connectors. Accordingly, the description hereinafter of a fiber optic connector incorporating the audible indicator of the present invention is not to be construed as limiting the application of the invention to any particular form of connector.

SUMMARY OF THE INVENTION

According to a principal aspect of the present invention, there is provided a connector containing an audible indicator for indicating the mating of the connector member with a second connector member having an actuating surface thereon. The first connector member containing the audible indicator includes a movable actuating element which is mounted in the connector body within its outer periphery and, hence, not in the coupling nut as in the prior art connectors. The actuating element is exposed at the front of the connector body and is adapted to be moved by the actuating surface on the second connector member when the connector members are mated. The audible indicator is activated in response to movement of the actuating element by the actuating surface on the second connector member. In a preferred embodiment of the invention, the actuating element is mounted in a polarizing key mounted on the center axis of the connector body.

DESCRIPTION OF THE PREFERRED EMBODIMENT

Figure 1:
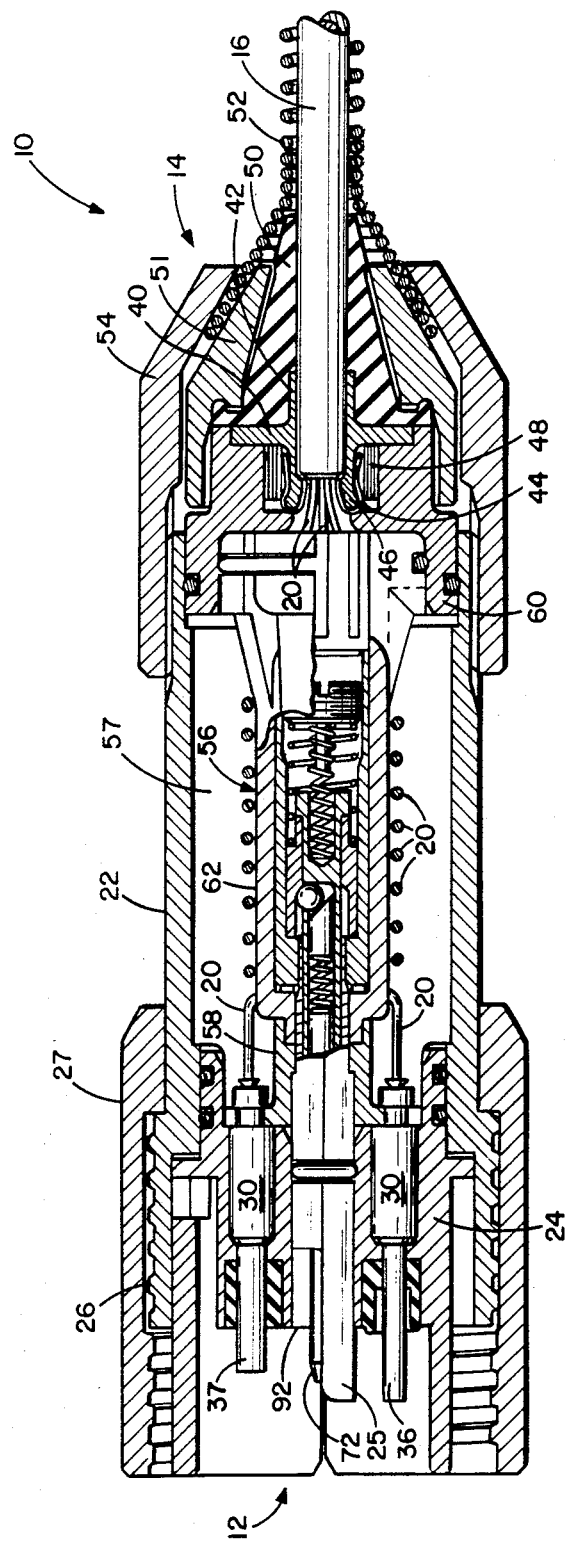
FIG. 1 is a partial longitudinal sectional view through a two-ferrule fiber optic connector member embodying the audible indicator and polarizing arrangement of the present invention.
Figure 2:
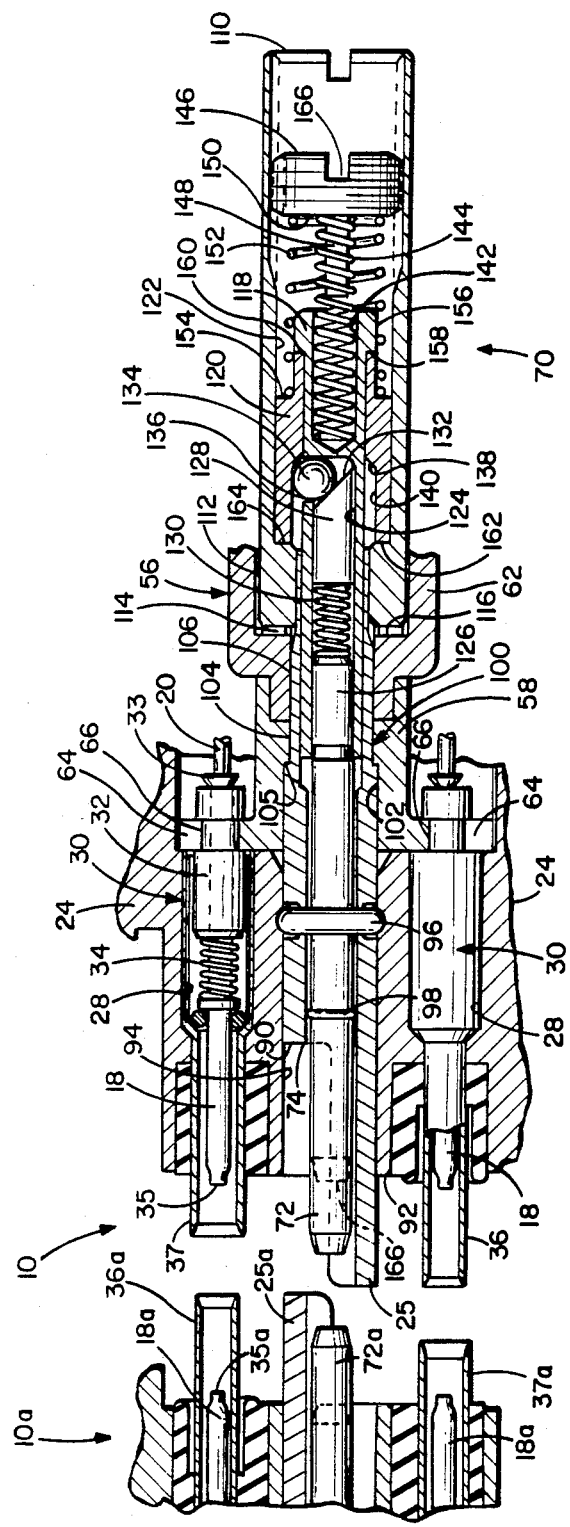
FIG. 2 is an enlarged fragmentary view showing the ferrule support, audible indicator and polarizing arrangement illustrated in FIG. 1, as well as the forward end of a second connector member arranged to mate with the first connector member.

Reference is now made to FIGS. 1 and 2 of the drawings in detail which show a fiber optic connector member, generally designated 10, having a forward mating end 12 and a rear end 14 through which there extends a fiber optic cable 16. The connector member is illustrated as containing two fiber optic ferrules 18, each connected to a fiber 20 of the cable 16.

The connector member 10 is shown as being in the form of a hermaphroditic connector member, although the invention is certainly not limited to that form of connector. The connector member comprises a shell 22 having a ferrule support member or insert 24 mounted in its forward end. A polarizing key 25 extends forwardly from the support member 24 which will engage a like polarizing key 25a on the mating connector member 10a shown in FIG. 2. The polarizing key will be described in detail later. The forward end of the shell is threaded as indicated at 26. The connector members 10 and 10a may be identical, except for the provision of a threaded coupling nut 27 on shell 22 which will engage threads on the shell of connector member 10a corresponding to the threads 26.

The support member 24 contains two axially extending passages 28 each receiving a ferrule assembly or contact, generally designated 30, which contains a ferrule 18. Each contact includes a rear body 32, an inner tube 33 slidable within the body 32 and fixed to the ferrule 18, and a coil spring 34 which surrounds the tube 33 in front of the body 32. The spring biases the ferrule in the forward direction so that when the ferrule mates with a second ferrule 18a in the mating connector member 10a, the ferrule 18 may retract rearwardly against the force of the coil spring 34 whereby the mating end faces 35 and 35a of the ferrules will be maintained in contact. The optical fiber 20 enters the contact 30 through the inner tube 33 and terminates at the end face 35 of the ferrule.

A guide sleeve 36 of relatively small diameter surrounds the lower ferrule 18 illustrated in FIG. 2, while a larger diameter guide sleeve 37 surrounds the upper ferrule 18. The guide sleeve 37 is dimensioned to slidably receive a guide sleeve 36a of the mating connector member 10a. The guide sleeve 36a is dimensioned to slidably receive the ferrule 18 so that there is a telescoping interengagement between the aligned sleeves 36a and 37 which brings the mating ferrules into precise lateral alignment. The lower set of mating guide sleeves 36 and 37a shown in FIG. 2 function in the same manner.

Referring now to the rear termination end of the connector, the cable 16 passes through a crimp body 40. The rear 42 of the crimp body is crimped onto the jacket of the cable 16. The cable strength member 44 is folded back over the forward end 46 of the crimp body 40 and an outer sleeve 48 is crimped over the strength member to secure the strength member to the crimp body. A sealing member 50 surrounds the rear portion of the crimp body. A clamp ring 51 surrounds the sealing member 50 and extends forwardly over the crimp body 40. A strain relief coil spring 52 surrounds the clamp ring 51 and the cable 16 where it enters the rear of the connector. A coupling nut 54 is threaded onto the rear of the connector shell 22 to hold the spring 52 and retain the internal parts within the shell 22.

A mandrel, generally designated 56, is mounted in a fiber flex chamber 57 which is formed between the rear of the ferrule support member 24 and the crimp body 40. The mandrel comprises a forward yoke 58 and a rear support 60 which fits over the outer crimp sleeve 48 and inside the clamp ring 51. The clamp ring is threaded on the rear support 60 to compress the sealing member 50. The central portion 62 of the mandrel is generally cylindrical. The fibers 20 of cable 16 are loosely wound around the central portion of the mandrel, for example, in helical form which facilitates accumulation of the fibers in the flex chamber when the ferrules 18 retract upon mating of the connector members 10 and 10a.

The yoke has a pair of radially extending slots 64 therein which receive the rear portions of the contacts 30. More specifically, an annular groove 66 is formed in the rear body 32 of each contact providing a reduced diameter section on the rear body which is slightly smaller than the width of the groove 64. Each contact is mounted on the yoke by being inserted radially downwardly through one of the slots 64, the enlarged areas of the rear body 32 retaining the contact axially on the yoke.

The audible indicator of the present invention, generally designated 70, is mounted within the interior of the central cylindrical portion 62 of the mandrel 56. The indicator is activated by an elongated actuating pin 72 which extends through a central cylindrical passage 74 extending through the polarizing key 25. The center axes of the actuating pin 72 and polarizing key 25 are coaxial with the center axis of the support member 24 of the connector.

Figure 3:
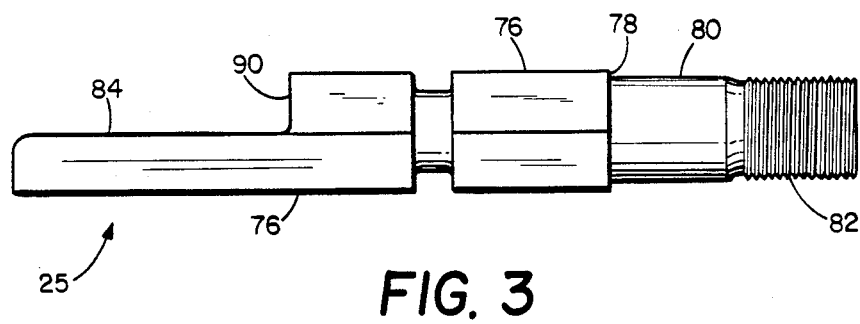
FIG. 3 is a side view of the polarizing key utilized in the present invention.
Figures 4, 5:
FIG. 4 is a front end view of the polarizing key illustrated in FIG. 3.
FIG. 5 is a rear end view of the polarizing key.

As seen in FIGS. 3–5, the portion 76 of the polarizing key 25 in front of a rearwardly facing shoulder 78 has a hexagonal configuration, while the portion 80 of the key behind the shoulder 78 is cylindrical, and is threaded at its rear end as indicated at 82. A cutout 84 is formed in the front of the forward portion 76 of the key providing a pair of flat surfaces 86 on opposite sides of a semi-cylindrical channel 88 formed by the passage 74 extending through the key. The rear of the cutout 84 forms a shoulder 90 which is spaced behind the front face 92 of the support member 24. The forward end of the key extends beyond the front face 92 of the support member. The end of the actuating pin 72 is spaced a short distance behind the front of the key when the connector members 10 and 10a are disengaged.

The forward hexagonal portion 76 of the key is mounted in a central, axially extending passage 94 of complementary hexagonal configuration so that the polarizing key may not rotate in the support member. It will be appreciated that the key may be mounted in six different positions within the hexagonal passage 94 for interengagement with the mating polarizing key 25a in the connector member 10a which is positioned so that the respective surfaces 86 on the forward ends of the keys will slide over each other when the connector members are mated. An O-ring 96 provides a seal between the polarizing key and the wall of the passage 94. A second O-ring 98 provides a seal between the actuating pin 72 and the wall of the passage 74.

A passage 100 extends through the yoke 58. The forward portion 102 of the passage has an hexagonal configuration which slidably receives the rear of the hexagonal portion 76 of the key. The passage 100 also includes a cylindrical section 104 defining between it and the hexagonal section 102 a forwardly facing shoulder 105 which is engaged by the shoulder 78 on the key. A cylindrical passage 106 is formed in the forward end of the central portion 62 of the mandrel coaxial with the passage 104. The passages 104 and 106 receive the rear portion 80 of the key.

The audible indicator 70 comprises a cylindrical housing 110 which is mounted within the interior of the central portion 62 of the mandrel. The forward end 112 of the housing is threaded onto the threaded rear end 82 of the key. A wave washer 114 is positioned between the front end of the housing and a shoulder 116 formed in the interior of the central portion 62 of the mandrel. A retainer 118 is slidably mounted in a plunger 120 which is slidable within a cylindrical bore 122 formed inside the housing 110.

An axial bore 124 is formed in the forward end of the retainer 118. The bore slidably receives the rear 126 of the actuating pin. A positioning rod 128 is mounted in the rear portion of the bore 124. A release spring 130 is positioned between the rear of the actuating pin and the positioning rod. The rear surface 132 of the rod 128 is inclined at an angle of about 45 degrees. A ball 134 is mounted in an opening 136 in the wall of the retainer 118, with the inner portion of the ball engaging the inclined surface 132 on the positioning rod 128 and the outer portion of the ball engaging a beveled surface 138 formed in the bottom of a cylindrical recess 140 opening at the forward end of the plunger 120.

A central bore 142 is formed in the rear of the retainer 118. A coil spring 144 is mounted in the bore 142. An adjusting screw 146 is threaded into the rear of the housing 110. The screw has a forwardly extending rod 148 thereon which extends into the interior of the spring 144. The spring bears against the front face 150 of the screw. A second, larger diameter coil spring 152 extends from the front face 150 of the adjusting screw forwardly over the rear of the retainer 118 with its forward end abutting a rearwardly facing annular shoulder 154 formed on the plunger 120. A head 156 is formed on the rear of the retainer 118 providing a forwardly facing shoulder 158 which is normally maintained engaged with the rear end 160 of the plunger 120 by the force of the spring 144. The spring 152 retains the plunger 120 in a forward position within the bore 122 in housing 110 with its front face 162 engaging a rearwardly facing shoulder 164 formed in the forward end of the bore. A slot 166 is formed in the rear of the screw 146 for receiving the end of a screwdriver which may be utilized to change the position of the screw 146 within the housing 110 and thus the compression of the springs 144 and 152.

To mate the connector members 10 and 10a, the members are brought into general alignment as illustrated in FIG. 2 so that the flat surfaces 86 on the polarizing key 25 will be positioned to slidably engage the corresponding flat surfaces on the polarizing key 25a whereby the corresponding guide sleeves 36a, 37 and 36, 37a will be aligned with each other. As engagement of the two connector members proceeds, the forward end of the actuating pin 72a on the connector member 10a will engage the forward end of the actuating pin 72, causing both pins to retract rearwardly in the connector bodies. The actuating pins will engage just prior to engagement of the respective guide sleeves in the connector members. Continued movement of the connector members toward each other will cause pressure to be applied to the spring 152 through the actuating pin 72.

release spring 130, positioning rod 128, the ball 134 and the plunger 120, causing the plunger to shift rearwardly in the bore 122 in housing 110. The preload of the spring 130 is greater than the preload of the spring 152 so that the latter spring will compress during rearward movement of the actuating pin 72 in the connector body. When the spring 152 is compressed to such an extent that it develops a load equal to the static load of spring 130, the latter spring will compress allowing the ball 134 to recede within the interior of the retainer 118, thereby releasing the plunger 120 which impacts the shoulder 162 within the housing providing an audible indication of full mating of the connector members 10 and 10a. Thus, it will be appreciated that the audible indicator 70 of the invention functions similar to a center punch. The position of the forward end of the actuating pin 72 at full mating of the connector halves is indicated in phantom at 168 in FIG. 2. The force of the spring 152 is adjusted by the screw 146 so that the audible indication occurs after the mating end faces 35 and 35a of the ferrules 18 and 18a have engaged, and the ferrules have retracted rearwardly a short distance against the force of the springs 34 which will assure that the mating end faces of the ferrules will be retained in engagement with each other.

When the connector members are unmated, the spring 144 shifts the retainer 118 rearwardly to the position shown in FIG. 2, whereupon the ball 134 will become repositioned in the recess 136 in the plunger 120, again preloading the spring 130.

While actuating pins 72 and 72a have been shown in both of the connector members 10 and 10a, respectively, only one of the connector members requires an audible indicator mechanism 70. For example, the pin 72a could be fixed in the key 25a of connector member 10a and the indicator eliminated therefrom. Also, the polarizing keys 25 and 25a could be eliminated, and the actuating pin 72 need not be mounted on the center axis of connector member 10. Also, the actuating pin 72 could simply engage the front face of the ferrule support in connector member 10a rather than an actuating pin.

The audible indicator arrangement of the present invention avoids special machining procedures and complex parts as required for the prior art indicators used in electrical connectors and, therefore, is relatively inexpensive. The audible indicator is itself quite small and, because it is located within the ferrule support or insert, permits the use of a small diameter connector shell. The indicator may also be eliminated from the connector without affecting the connector operation. Furthermore, because the indicator is located within the interior of the connector it is not susceptible to damage by dirt, dust or other contaminants.

What is claimed is:

1. A connector member adapted to mate with a second connector member having an actuating surface thereon comprising:
    a connector body containing at least one contact;
    said connector body having a front face;
    a movable actuating element slidable in an axially extending passage in said body, said actuating element being exposed at said front face of said body and adapted to be moved by the actuating surface of said second connector member when said connector members are mated; and
    means in said connector body for providing an audible indication of mating of said connector members, said means being responsive to movement of said actuating element by said actuating surface of said second connector member.

2. A connector member as set forth in claim 1 wherein:
    said connector member is hermaphroditic; and
    said actuating element is located on the center axis of said body.

3. A connector member as set forth in claim 1 wherein:
    said audible indication means comprises a spring loaded detent mechanism.

4. A connector member adapted to mate with a second connector member having an actuating surface thereon comprising:
    a shell surrounding an insert containing at least one contact;
    a movable actuating element mounted in said insert, said actuating element being exposed at the front of said insert and adapted to be moved by the actuating surface of said second connector member when said connector members are mated; and
    means responsive to the movement of said actuating element for producing an audible indication of mating of said connector members.

5. A connector member as set forth in claim 4 wherein:
    a coupling ring surrounds said shell.

6. A connector member as set forth in claim 4 wherein:
    said connector member is hermaphroditic; and
    said actuating element is slidable in an axially extending passage in said insert coaxial with the center axis of said insert.

7. A connector member as set forth in claim 4 wherein:
    said audible indication means is mounted in said shell behind said insert.

8. A connector member as set forth in claim 4 wherein:
    said contacts are fiber optic contacts;
    a yoke is mounted in a fiber flex chamber in said shell behind said insert; and
    said audible indication means is mounted in said yoke.

9. A connector member as set forth in claim 4 wherein:
    said insert has an axially extending passage therethrough;
    said actuating element is mounted in said passage and extends beyond the rear of said insert; and
    said audible indication means is mounted in said shell behind said insert and aligned with said actuating element.

10. A connector member as set forth in claim 9 wherein:
    said audible indication means comprises a spring loaded detent mechanism.

11. A connector member as set forth in claim 4 wherein:
    a hollow polarizing key extends forwardly from the front of said insert; and
    said actuating element is slidable in said key.

12. A connector member as set forth in claim 4 wherein:
    a passage extends axially from the front of said insert coaxial with the center axis of said insert;
    a hollow polarizing key is mounted in said passage and extends forwardly of said front of said insert;

said actuating element is axially slidable within said key; and said audible indication means comprises a detent mechanism behind said actuating element.

13. A connector assembly comprising:

first and second mating connector members;

said first connector member having a forwardly facing actuating surface thereon;

said second connector member comprising:

a connector body containing at least one contact;

said connector body having a front face and an outer periphery;

a movable actuating element mounted in said body within said outer periphery, said actuating element being exposed at said front face of said body and moved by the actuating surface of said first connector member when said connector members are mated; and means in said connector body for providing an audible indication of mating of said connector members, said means being responsive to movement of said actuating element by said actuating surface of said first connector member.

14. A connector assembly as set forth in claim 13 wherein:

said actuating element is slidable in an axially extending passage in said body.

15. A connector assembly as set forth in claim 14 wherein:

said actuating element is located on the center axis of said body.

16. A connector assembly as set forth in claim 13 wherein:

said audible indication means comprises a spring loaded detent mechanism.

* * * * *